(12) United States Patent
Wettergren

(10) Patent No.: US 6,996,840 B1
(45) Date of Patent: Feb. 7, 2006

(54) METHOD FOR EXECUTING A SECURITY CRITICAL ACTIVITY

(75) Inventor: Christian Wettergren, Stockholm (SE)

(73) Assignee: Myspace AB, Stockholm (SE)

( * ) Notice: Subject to any disclaimer, the term of this patent is extended or adjusted under 35 U.S.C. 154(b) by 0 days.

(21) Appl. No.: 09/460,376

(22) Filed: Dec. 13, 1999

Related U.S. Application Data

(60) Provisional application No. 60/112,889, filed on Dec. 18, 1998.

(51) Int. Cl.
*G06F 17/00* (2006.01)

(52) U.S. Cl. ................................ 726/11; 726/3; 726/12

(58) Field of Classification Search ................ 709/9; 705/410; 726/1–26; 713/200–202, 150–152
See application file for complete search history.

(56) References Cited

U.S. PATENT DOCUMENTS

| | | | | |
|---|---|---|---|---|
| 4,809,160 A | * | 2/1989 | Mahon et al. | 713/200 |
| 5,406,624 A | * | 4/1995 | Tulpan | 713/192 |
| 5,596,718 A | * | 1/1997 | Boebert et al. | 713/201 |
| 5,680,452 A | | 10/1997 | Shanton | |
| 5,845,068 A | * | 12/1998 | Winiger | 713/200 |
| 5,914,472 A | * | 6/1999 | Foladare et al. | 235/380 |
| 5,920,861 A | * | 7/1999 | Hall et al. | 707/9 |
| 5,933,498 A | * | 8/1999 | Schneck et al. | 705/54 |
| 6,009,518 A | * | 12/1999 | Shiakallis | 713/1 |
| 6,530,024 B1 | * | 3/2003 | Proctor | 713/201 |
| 2001/0014839 A1 | * | 8/2001 | Belanger et al. | 700/245 |

FOREIGN PATENT DOCUMENTS

| | | |
|---|---|---|
| GB | 2 267 986 | 12/1993 |
| WO | WO 94/01821 | 1/1994 |
| WO | WO 98/19243 | 5/1998 |

OTHER PUBLICATIONS

Computer security: Proxy-based security protocols in networked mobile devices; M. Burnside, D. Clarke, T. Mills, A. Maywah, S. Devadas, R. Rivest ; Mar. 2002; Proceedings of the 2002 ACM symposium on Applied computing.*

Security: A privacy-protecting proxy signature scheme and its application; Jia-Zhu Dai, Xiao-Hu Yang, Jin-Xiang Dong; Apr. 2004 ;Proceedings of the 42nd annual Southeast regional conference.*

On the security of some proxy blind signature schemes; Hung-Min Sun, Bin-Tsan Hsieh; Jan. 2004 ; Proceedings of the second workshop on Australasian information security, Data Mining and Web Intelligence, and Software Internationalisation—vol. 32 C.*

* cited by examiner

*Primary Examiner*—David Jung
(74) *Attorney, Agent, or Firm*—Young & Thompson

(57) ABSTRACT

The present invention relates to a method for executing a security critical activity in a security device (40), wherein the security critical activity is executed with user involvement. Each security critical activity is divided into a number of situations/actions, belonging either to a proxy letter group or a user involvement group. The processor (42) of the security device (40) starts the execution of an action of a security critical activity, and then checks if this situation/action can be handled by a proxy letter or shall be handled by a user. If the user or the proxy letter grants the situation/action the execution of the action is continued and ended. This is repeated until all actions of the security critical activity have been executed. If neither the user nor the proxy letter grants the situation/action the execution of the security critical activity will be stopped.

10 Claims, 4 Drawing Sheets

METHOD FOR EXECUTING A SECURITY CRITICAL ACTIVITY

This application claims the benefit of provisional application No. 60/112,889, filed Dec. 18, 1998.

BACKGROUND OF THE INVENTION

1. Field of the Invention

The present invention generally relates to a method for executing a security critical activity running on a security device, and particularly to a method for executing a security critical activity with user involvement.

2. Background

Advances in computer and communications technology have increased the flow of information between and within computer networks. This ability to communicate between computers and networks has also made it possible to develop a wide variety of services that can be performed from your own personal computer. Such services may for example be mailing, home shopping, home banking etc. Many of these services comprise security critical activities that have to be performed when the computer is on-line, such as transferring money through Internet.

Performing such security critical activities, is of course a security risk, since also potential intruders can listen to and/or compromise these security critical activities, by breaking into the computer. One of the reasons for this is that the operating systems of personal computers were not designed with security in mind, since they were personal and without connections to any network. Thus, it is easy to use malicious code, Trojan horses or the like to compromise the operating system of a personal computer and thereby the security critical activities executed thereon. Also more secure operating systems, such as Unix, may be compromised with a relatively small effort. Today there is no commercial operating system that protects the user from Trojan horses.

Over the years there have been many suggestions how to solve this security problem such as firewalls, smart cards, the use of passwords for access to certain services etc. However, many of these solutions are mainly software based. Since software always contains bugs, it is corruptible, and may therefore be compromised by exploited security holes, malicious code, resident Trojan horse software etc. Software based security solutions are also too brittle, i.e. if the operating system security is compromised all data and all applications that are executed thereon will also be compromised.

Another approach to increase the operating system security is to build a multi level secure (MLS) operating system. Such systems label objects and subjects according to a security classification, and define rules for how information is allowed to flow through the system. The classification of different security levels and the record keeping of which users that have access to different security levels and objects is very time consuming to maintain. Furthermore, conventional personal computer applications are not compatible with the operating systems of the MLS system, and all applications have to be tailor-made for the MLS system. This is of course very costly.

WO94/01821 discloses a trusted path subsystem for workstations, such as personal computers. The system comprises a network computer, which is a MLS computer and a workstation. The object of the invention is to provide safe communication between a trusted subsystem of the MLS computer and the workstation. To solve this problem the workstation is connected to a trusted path subsystem, which receives the encrypted data from the trusted system of the MLS computer and decrypts it without involving the workstation. Thus, the application running on the MLS-system will be certain that the data received will be the same as the data sent from the trusted subsystem of the MLS computer, and vice versa.

UK patent application GB 2 267 986 discloses a security device for a computer. The object of this security device is to isolate the computer from the input/output devices, such as keyboard and mouse, when security critical activities are to be performed. The security device can operate in either a transparent mode or a special handling mode. In the transparent mode the data inputted from the input/output devices is transmitted through the security device directly to the computer, i.e. the security device is in a passive mode. In the special handling mode the security device itself will perform the processing of the data without any involvement of the computer. The processing of the security critical activity in the security device is done automatically, without any user involvement. Hence, the user can not be certain which steps are performed within the security device.

Even if the systems described in GB 2 267 986 and WO94/01821 provide a high degree of security they still have a major drawback, namely they are system orientated and lack user involvement during the execution of the security critical activity.

WO98/19243 discloses another approach in solving the security problem, namely user involvement. WO98/19243 discloses a method and a security system for processing a security critical activity. The system comprises a security device connected to a personal computer and to input/output devices. When the application running on the computer needs to perform a security critical activity the security device is allocated and the control of the data processing and the input/output devices are transferred from the computer to the security device. The data processing of the security critical activity is then executed on the security device with user involvement, i.e. the user must grant each security critical activity. The execution of a security critical activity may even require more than one user involvement step, i.e. the user must be involved several times to grant different parts of the security critical activity.

Even if the system and the method described in WO98/19243 have made a substantial contribution to security, when executing a security critical activity, this is made to a degree where the user has to grant each and every part of the security critical activity to be executed. This continuous involvement of the user may also lead to a decrease in security, since the user after a while mechanically may grant every part of the security critical activity, without carefully checking what he is granting. Thus, there is a need for a method that not constantly involves the user during the processing of security critical activities.

SUMMARY OF THE INVENTION

Thus, the objective problem to be solved by the present invention is to provide a method for processing security critical activities with user involvement, but without constantly bothering the user for each and every part of the security critical activity to be executed.

This problem is solved by a method as defined in claim 1.

Preferred embodiments of the invention are defined in the dependent claims 2–5.

By using the method according to the present invention the user will not constantly be asked to grant each part of a security critical activity, since the proxy letter created by the user will grant all the security steps defined by the user. Thus, by relieving the user from performing the granting of every security critical step, the user can focus on the important security steps to be granted. In this way the user will be more concentrated each time he shall grant an action.

Thus, with the method according to the invention it is possible to maintain or even increase the security obtainable by using a security device as described in WO98/19243, but without the constant user interruption. The work situation of the user will of course also be more ergonomic, since the proxy letter defined in the security device grants many monotonous steps.

BRIEF DESCRIPTION OF THE DRAWINGS

The foregoing and other aspects of the present invention will be best appreciated with reference to the following detailed description of a specific embodiment of the invention, given by way of example only, when read in conjunction with the accompanying drawings, wherein.

DESCRIPTION OF THE PREFERRED EMBODIMENTS

Even if the present invention will be described as using a specific security device or security system, it is believed that any security device having the following features may be used. Such a generic system is defined by having a protected processing space with a protected data memory, means for secure communication with the user through input/output devices, means for communicating with a computers ordinary processing space and programmed user involvement steps stored in the protected data memory.

However, the method according to the invention will be described in conjunction with the security system disclosed in WO98/19243, which hereby is incorporated as reference. Thus, such a system will be described first.

Figure 1:
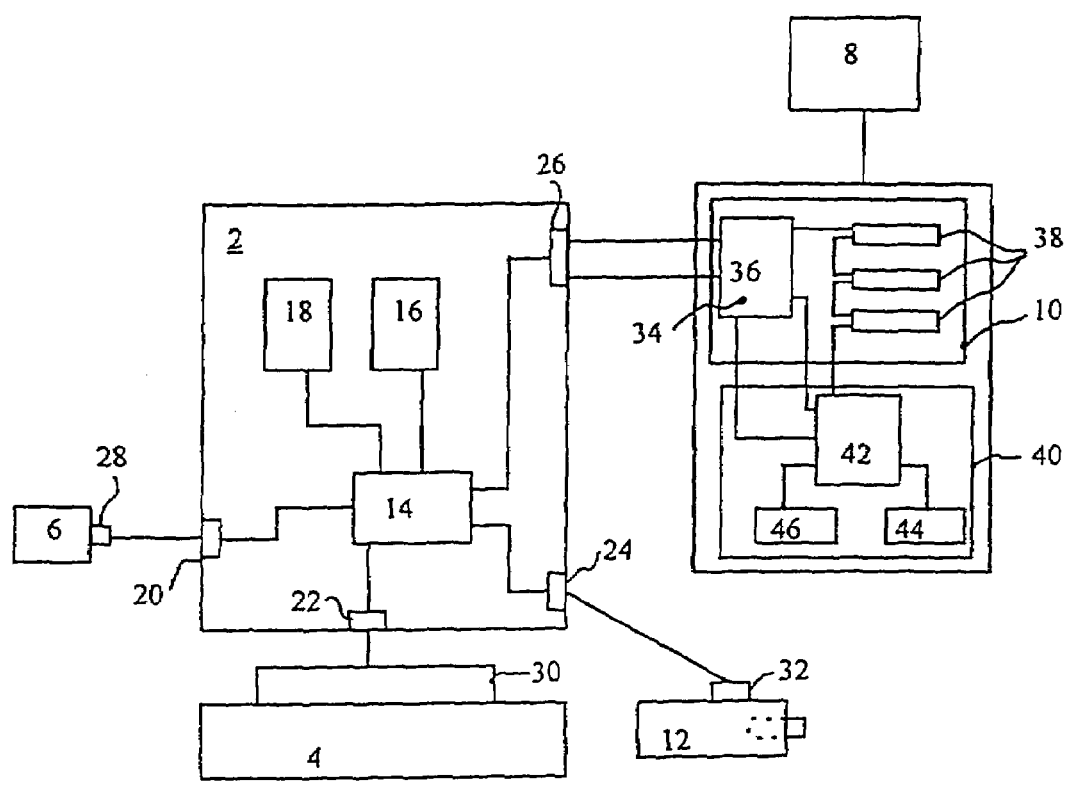
FIG. 1 shows a block diagram of a security system on which the method according to the present invention may be performed.

FIG. 1 shows one embodiment of a security system on which the present invention may be performed. Such a system is used to perform security critical activities when the system is connected to a public network and comprises an arbitrary personal computer 2, input/output devices such as a keyboard 4, a mouse 6, a display 8, and a smart card reader/writer (r/w) 12.

The personal computer 2 is provided with a processor 14, a read only memory (ROM) 16 and a random access memory (RAM) 18. Each physical input/output device 4, 6, 8, 12 is connected to the computer 2 through a suitable communication interface 20, 22, 24, 26. As can be seen in FIG. 1, the display 8 is connected to the computer 2 via a screen device controller 10. Each input/output device 4, 6, 8, 12 is also provided with a switching and crypto device 28, 30, 32, 34, the function of which is to be described below. It shall be understood that also the input/output devices 4, 6, 12 have device controllers, which in the shown embodiment are incorporated in the switching and crypto devices 28, 30, 32.

The screen device controller 10 comprises a screen control circuit 36 and a screen memory 38. In this embodiment the screen controller 10 is connected to a security device 40, comprising a processor 42, a PROM 44 and a RAM 46. The processor 42 of the security device 40 is connected to the screen circuit 36 and to the screen memory 38 and also to the PROM 44 and the RAM 46. The processor 42 is also connected to and controls the switching and crypto device 34 provided in the screen circuit 36. In this embodiment the switching and crypto device 34 serves as blocking means, i.e. prevents the processor 14 of the computer 14 from getting access to the screen device controller 10.

Figure 2:
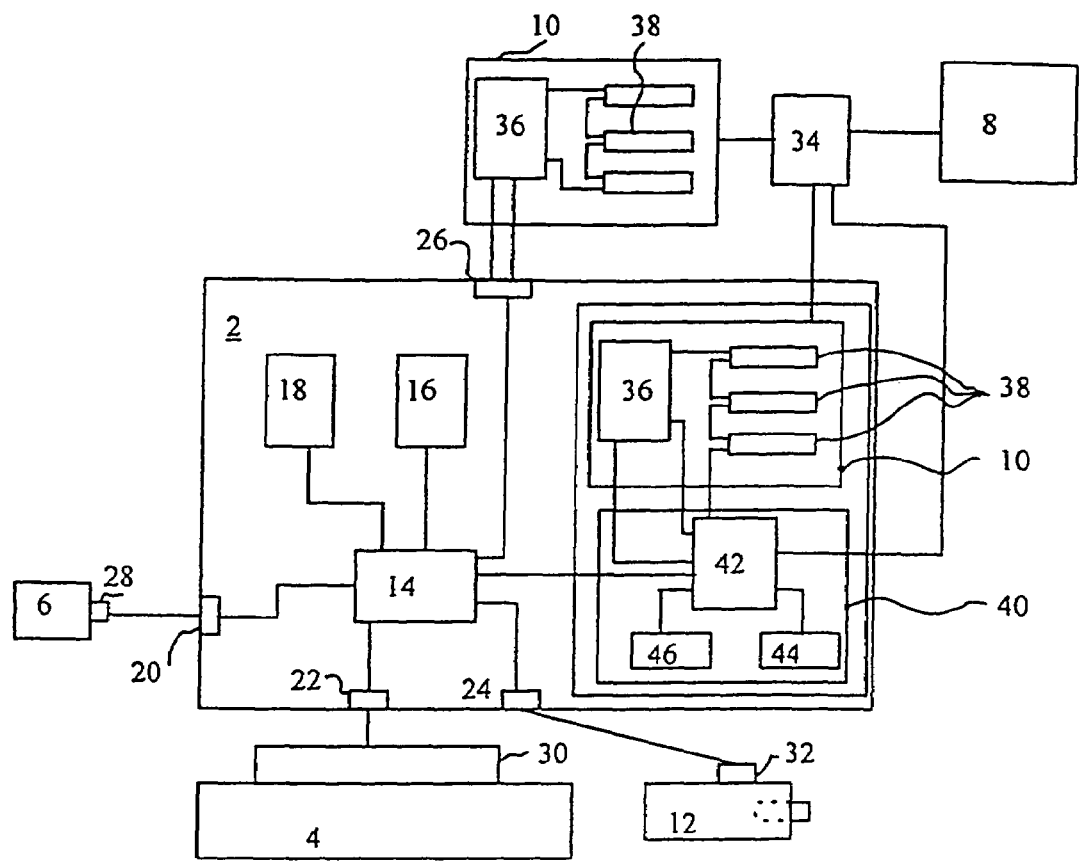
FIG. 2 shows a block diagram of another security system on which the method according to the present invention may be performed.

FIG. 2, shows an alternative embodiment of the security system, in which the security device 40 is incorporated within the computer 2. In such an embodiment the screen device controller 10 is duplicated and the switching and crypto device 34 is acting as an ordinary switch, which is controlled by the security device 40, in order to switch between the two screen control devices 10.

As mentioned above the security system is used to perform security critical activities when the system, i.e. the computer 2, is connected and on-line with a network. If the computer is a standalone computer there is no need for a security device 40, since no intruder is able to listen or compromise with the processed data. Thus, the present invention is directed towards computers that are on-line with networks. Security critical activities are activities that the user wishes to perform in privacy, i.e. without the danger of having an intruder listening to or compromising the security critical activity. Examples of such security critical activities are transferring money, signing documents, and preparing confidential mails and the like.

The execution of a security critical activity can also, as mentioned above, require more than one user involvement step, i.e. a security critical activity may be divided into, different parts which each have to be granted by the user. As defined in the present invention each such part is called an action. Thus, in the context of the present invention, granting a security critical activity means granting the security critical activity as a whole, if it only comprises one action, or granting a chain of actions, if several user involvement steps are required. However, it should be noted that it is not the action itself that is granted, but the situation in which the action may be granted. Thus, in the context of the present application granting an action means granting an action under certain circumstances as will be described in detail below.

Furthermore, the situation under which each action is performed can be divided into two subgroups, namely a proxy letter group and a user involvement group. Thus, depending on the situation the same action may be found several times in one group or in both groups. It is the combination of the action and situation under which it is performed that is the basis for dividing it into groups. The two groups will be explained more in detail below.

The security systems having the configuration as described above are operable in two different modes. In a first mode, defined as the normal mode, the security system operates as an ordinary computer, i.e. the security device 40 is in a passive mode. In a second mode, defined as the secure management mode, the security device 40 takes over the control of the data processing in order to, in a reliable way, perform different security critical activities.

The method according to the present invention is applicable when the security system is operated in the secure management mode. It is in this mode the user has to grant, in some way, each action of the security critical activity. If the user has to grant each action directly himself this may lead to decreased security, since as mentioned above the user after a while may mechanically grant every action, without carefully checking what he is granting.

Figure 3:
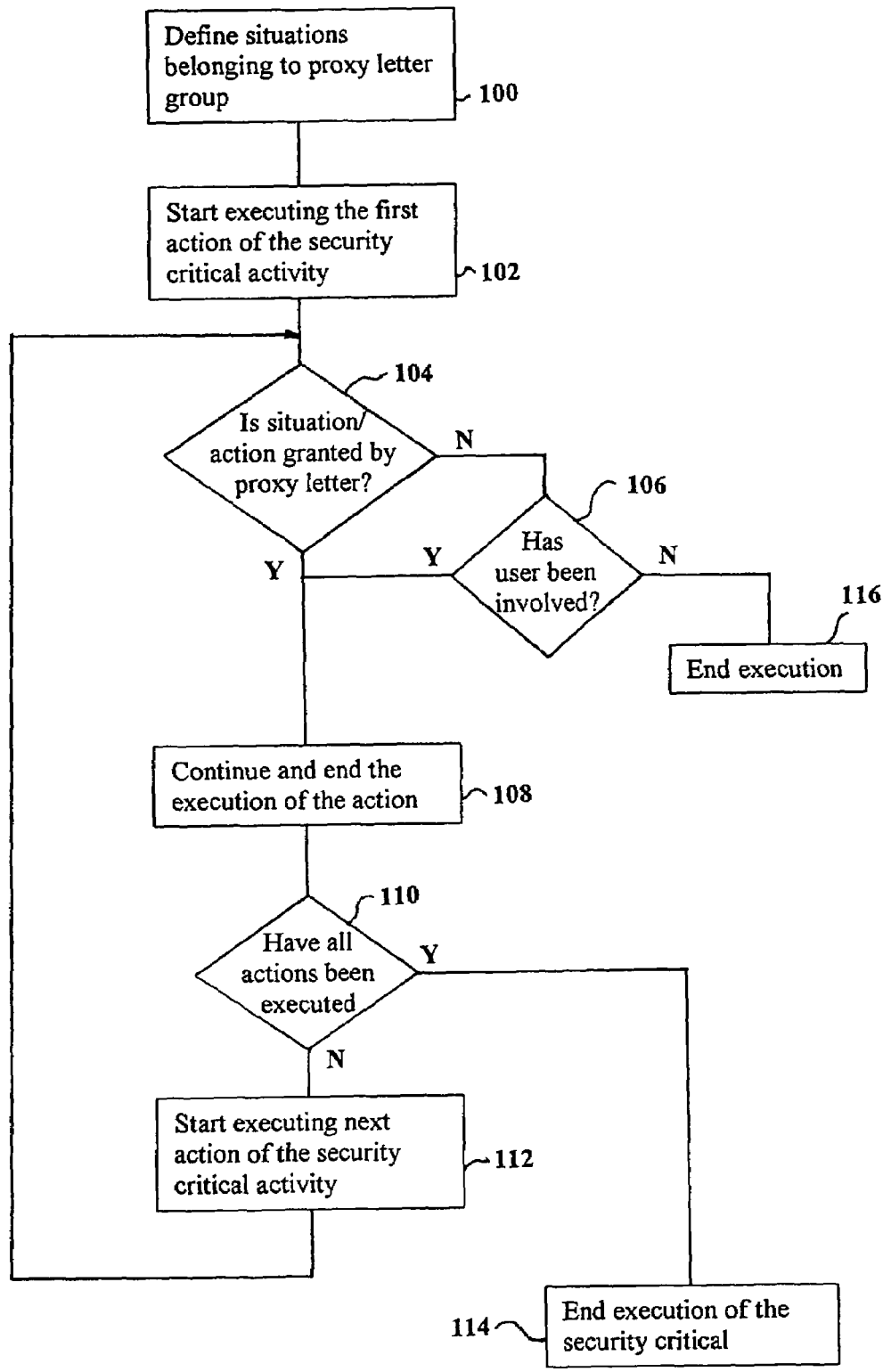
FIG. 3 shows a flow chart of the method according to the invention.

Thus, now the method according to the present invention will be described in conjunction with FIG. 3. The first step 100 of the method is to define under which situation the action or the actions of the security critical activity can be granted indirectly by the user. An example of such a situation may be the payment of an amount that is smaller then a predetermined amount, for example $10, to a predetermined account. What is granted, in this case, is the request of for example $6, as long as the requested amount is less than $10. It shall be noted once again that it is the situation and not the action itself that determines if the action is to be granted directly or indirectly by the user. If for example the action payment in the example above is in a situation where $10,000 is to be transferred, the user may have to grant this directly.

The situations where an action can be granted indirectly by the user is, according to the present invention, defined in a proxy letter, which may be stored in the PROM 44 of the security device 40. The proxy letter may of course also be stored in a protected RAM 46 of the security device 40. In the context of this application, a secure memory, will mean either of the above mentioned memories 44, 46 or any other secure memory associated with the security device.

Thus, the situations under which the action may be performed, as defined by the proxy letter, will belong to a proxy letter group. All other situations, which are not defined by the proxy letter, will be part of a user involvement group.

The creation of a proxy letter, i.e. the definition of less critical situations may be done in a number of ways. One way is to enter the secure management mode and defining those situations, which are to be considered less critical and then store these in the secure memory. Since the proxy letter is created within the security device 40, the user can be absolutely sure that the proxy letter only contains situations defined by him. Another way is to create the proxy letter somewhere outside the security device and then load it into the secure memory associated therewith. The loading process of such a proxy letter must then of course by monitored and granted by the user with user involvement, step by step, to secure that the proxy letter does not contain anything against the will of the user. Preferably the proxy letter is written or defined in plain text, i.e. it is created in the same way as when the user grants an action directly. Thus, the creation of the proxy letter may be seen as a user involvement step with a time-delay. As already mentioned previously, live user involvement is referred to as direct user involvement and user involvement by means of a proxy letter is referred to as indirect user involvement.

It shall be noted that this first step 100 of the method does not always have to be performed when using the method according to the invention. However, a proxy letter must be defined before the method can be applied, but if defined the already existing proxy letter or letters may be used. Thus, this first step 100 is only performed initially before the method is used or when a proxy letter or letters have to be updated.

Thus, starting with the assumption that at least one proxy letter according to the will of the user is already loaded in the secure memory associated with the security device 40, the first step 102 of the method is to start the execution of the first action of the security critical activity. Thereafter the microprocessor 42 of the security device 40 will check in what situation this action is to be performed, i.e. check if the situation belongs to the proxy letter group at step 104. This is done, by reading the proxy letters and see if any proxy is allowed to grant the action letter under the present situation. If there is, the action in this situation belongs to the proxy letter group and if not the action belongs to the user involvement group.

Depending on what group the situation under which the action is to be performed belongs to different steps will be taken by the method according to the present invention. If the situation/action belongs to the proxy letter group, this means that the proxy letter can grant the action without direct user involvement. However, it shall be noted that even if the user is not directly involved, he is the one who created the proxy letter and thus the action is performed with indirect user involvement. If on the other side the situation/action belongs to the user involvement group the action must be granted directly by the user. It shall be understood that the user always is in control of the execution of the security critical activities and that he at any time can cancel a proxy letter and take a direct control of the action to be executed.

If, at step 104, it is determined that the situation/action cannot be granted by the proxy letter, the user will have to be involved to continue the processing of the security critical activity and the method continues to step 106. The user involvement step 106 will be described in detail in conjunction with FIG. 4 below. However, if the user is not involved within a predetermined time the execution of the action will be timed out and the secure management mode will be exited at step 116.

After the situation/action has been granted either by the proxy letter, at step 104, or by the user, at step 106, the processor 42 will continue the execution of the action at step 108. Thereafter, at step 110, the processor checks if all actions of the security critical activity have been executed. If the answer is no, the execution of the next action of the security critical activity will be started, at step 112, and steps 104 to 110 as described above will be repeated. This will continue until all the actions of the security critical activity have been executed and the security critical activity is ended at step 114.

Figure 4:
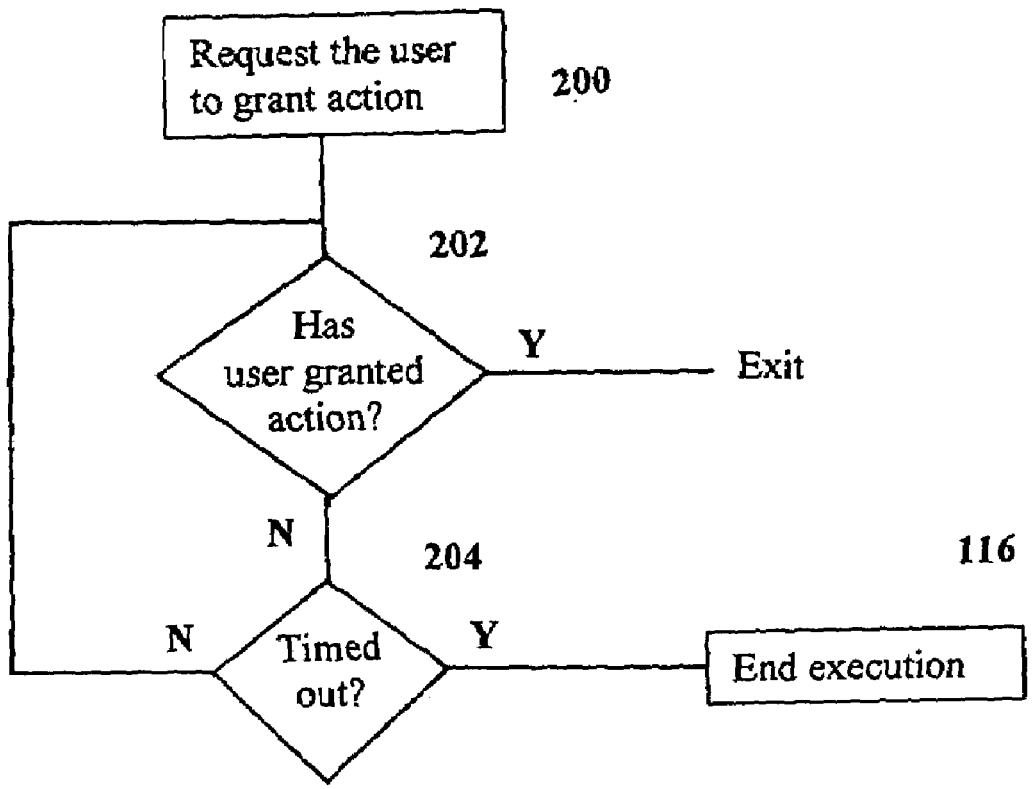
FIG. 4 shows a flow chart of the direct user involvement step according to the present invention.

Now the user involvement step 106 will be described in detail in conjunction with FIG. 4. If, at step 104, it is determined that the proxy letter cannot grant the situation/action, the flow chart of FIG. 4 is entered. Thus, steps 200 to 204 in FIG. 4 correspond to step 106 in FIG. 3.

Starting at step 200 the user is requested to grant the situation/action. The processor 42 then checks at step 202 if the user has granted the request, i.e. if the user has been involved. If the answer is yes the flow chart of FIG. 4 is exited and the method proceeds with step 108 in FIG. 3. However, if the user has not granted the request a timer is started. The timer is set to a predefined time. If during this time the user does not grant the request the processing of the security critical activity is terminated. Thus, at step 204 the processor 42 checks if the timer is timed out. If the answer is no the processor will wait for the user to grant the request until the timer is timed out. When the timer is timed out the processing of the security critical activity is terminated at step 116.

In a preferred embodiment of the invention the processor 42 will keep track on which of the proxy letter or the user, has granted each situation/action. This information is collected and stored as a log file. This may be an advantage if there is a dispute on who granted which action. It also gives the user reliable receipts of what he has done.

Now an example according to the present invention will be described. A security critical activity that often is performed is open file. Assuming that all files on the hard disk of the computer are encrypted the user has to use his private key to open a file. This key is stored in the security device and can only be accessed if allowed by the user, when running in the secure management mode.

Each time an application running on the computer wants to read a file the user has to grant file opening. This can occur often since an application may use many files. If this happens to often there will be a risk that the user grants all file openings without carefully checking that these files really belong to the files that the user wants to open.

It is in a situation like this the present invention is powerful. Instead of directly granting each situation/action the user can define a proxy letter that allows the application running on the computer to open certain files. Such a proxy letter may for example define that all files in the directory C:\my documents\public\*.* can be granted without direct user involvement, i.e. grant file opening/decryption if situation is filename matches directory C:\my documents\public\*.*.

In this way the decision to open a file can be made in two levels, namely by the proxy letter if the defined conditions are satisfied or directly by the user.

This will make the work situation much more comfortable since he not constantly is interrupted by routine task. Furthermore, the user is always in control, since he at any time can revoke a proxy letter.

Whilst this invention has been described in terms of preferred embodiments thereof, it will be appreciated that other forms could readily be adapted by one skilled in the art. Thus, even if an embodiment has been described wherein the proxy letter defines which actions/situations that are allowed to be granted it should be understood that a proxy letter also may define actions/situations that are to be prevented from being executed without any further user involvement. For example the application may request that an amount $10000 is to be transferred to a certain account. Assuming that a transaction of such an amount or to such an account never will be the case, the user can in the proxy letter define such cases. The proxy letter will then stop further execution of such actions/situations without any user involvement. Thus, by defining situations/actions that never would have come in question to be executed and prevent these with a proxy letter will further relieve the user. Accordingly, the scope of this invention is to be considered limited only by the following claims.

What is claimed is:

1. A method for executing on a computer a security critical activity having at least one action, the security critical activity being initiated by a user of the computer and executed by a security device connected to the computer, the method comprising the steps of:
    before starting execution of the security critical activity, the user of the computer defining in a proxy letter a situation in which the proxy letter is allowed to handle the security critical activity;
    starting execution of an action of the security critical activity in a present situation;
    determining, for the started action and the present situation and based on the proxy letter, whether (a) the proxy letter is allowed to handle the started action without direct user involvement or (b) the user is required to handle the started action;
    when the started action is handled by the proxy letter or by the user, completing the started action and repeating the starting execution and determining steps for each action in the security critical activity until each action in the security critical activity has been completed; and
    when started action is handled neither by the proxy letter nor by the user, stopping execution of the security critical activity.

2. The method of claim 1, wherein the defining step includes the step of defining in the proxy letter situations in which the proxy letter is allowed to grant an action.

3. The method of claim 1, wherein the defining step includes the step of defining in the proxy letter situations in which the proxy letter is allowed to prevent an action from being executed.

4. The method of claim 3, further comprising the steps of determining whether the proxy letter is allowed to prevent an action from being executed and stopping execution of the action when the action is one the proxy letter is allowed to prevent from being executed.

5. The method of claim 1, wherein the determining step includes the steps of reading the proxy letter and requesting direct user involvement if the proxy letter is not allowed to handle the started action.

6. The method of claim 5, following the step of requesting direct user involvement, further comprising the steps of waiting a predetermined period of time and, when direct user involvement has not occurred within the predetermined period of time, stopping execution of the security critical activity.

7. The method of claim 1, wherein the step of completing the started action comprises the step of logging whether the proxy letter or the user handled the action.

8. The method of claim 1, wherein the security critical activity includes a money transaction and wherein the defining step provides that the proxy letter is allowed to handle the started action without direct user involvement when an amount of money in the transaction does not exceed a predetermined amount and that the user is required to handle the started action when the amount of money in the transaction exceeds the predetermined amount.

9. A method for executing on a computer a security critical activity having at least one action, the security critical activity being initiated by a user of the computer and executed by a security device connected to the computer, the method comprising the steps of:
    operating the computer in a secure management mode in which permission of the user of the computer is required before performing each action of the security critical activity;
    before starting execution of the security critical activity, the user of the computer defining in the computer a first group of situations and a second group of situations, the first group being situations in which the user's permission to perform each action in the security critical activity is granted automatically without further involvement of the user, and the second group being situations in which the user's permission to perform each action in the security critical activity is not granted automatically and must be obtained prior to performing each action of the security critical activity;
    when performing the security critical activity, determining which one of the first and second groups of situations is applicable;
    completing the security critical activity by performing each action when the first group of situations is applicable, and completing the security critical activity by performing each action when the second group of situations is applicable and the user of the computer grants permission for each action to be performed; and not completing the security critical activity when the second group of situations is applicable and the user of the computer does not grant permission for an action of the security critical activity to be performed.

10. The method of claim 9, wherein the security critical activity includes a money transaction and wherein the first group of situations includes money transactions that do not exceed a predetermined amount of money and the second group of situations includes money transactions that exceed the predetermined amount of money.

* * * * *